United States Patent
Nakatsugawa et al.

(10) Patent No.: US 7,277,708 B2
(45) Date of Patent: Oct. 2, 2007

(54) ROUTER AND MOBILE COMMUNICATION TERMINAL FOR MOBILE COMMUNICATION NETWORK

(75) Inventors: Keiichi Nakatsugawa, Kawasaki (JP); Tsuguo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 10/125,806

(22) Filed: Apr. 19, 2002

(65) Prior Publication Data
US 2003/0144001 A1    Jul. 31, 2003

(30) Foreign Application Priority Data
Jan. 29, 2002    (JP)    ............................. 2002-019810

(51) Int. Cl.
*H04Q 7/20*    (2006.01)
(52) U.S. Cl. ................... 455/437; 455/440; 455/574
(58) Field of Classification Search ............... 455/436, 455/437, 440, 442, 443, 456.1, 456.5, 456.6, 455/574, 343.1, 552.1, 524, 525; 370/331, 370/332, 333
See application file for complete search history.

(56) References Cited

U.S. PATENT DOCUMENTS

| | | | |
|---|---|---|---|
| 5,121,126 A * | 6/1992 | Clagett ...................... 342/419 |
| 5,950,127 A | 9/1999 | Nitta et al. |
| 6,122,513 A * | 9/2000 | Bassirat ...................... 455/443 |
| 6,282,425 B1 * | 8/2001 | Hottinen ...................... 455/453 |
| 6,337,990 B1 * | 1/2002 | Koshino ...................... 455/574 |
| 6,351,647 B1 * | 2/2002 | Gustafsson ................... 455/466 |
| 6,449,482 B1 * | 9/2002 | Johansson et al. ........... 455/443 |
| 6,556,829 B1 * | 4/2003 | Persson ....................... 455/437 |
| 6,889,033 B2 * | 5/2005 | Bongfeldt ................... 455/11.1 |
| 2002/0173303 A1 * | 11/2002 | Shibutani ..................... 455/426 |

FOREIGN PATENT DOCUMENTS

| | | |
|---|---|---|
| JP | 9-121376 | 5/1997 |
| JP | 2000-92562 | 3/2000 |
| JP | 2000-183974 | 6/2000 |
| JP | 2000-196520 | 7/2000 |
| WO | WO 00/54523 | 9/2000 |

OTHER PUBLICATIONS

Chinese Offfice Action with translation dated Oct. 15, 2004.
Luming Yang et al. The Analysis and Improvement of Mobile IP Algorithm, Journal of Jishou University. vol. 21 No. 4, Dec. 2000.

* cited by examiner

*Primary Examiner*—Nguyen T. Vo
(74) *Attorney, Agent, or Firm*—Katten Muchin Rosenman LLP

(57) ABSTRACT

The present invention provides a mobile communication network system comprising a first mobile communication network having a plurality of routers, a second mobile communication network having a plurality of routers, and a mobile communication terminal. A router located in an end section of a communication area of the first mobile communication network sends an end message indicating that it is located in the end section, to the mobile communication terminal. The terminal initiates communications with a router of the second mobile communication network, whilst the terminal is communicating with the router located in the end section, upon receiving the end message sent by the router located in the end section.

4 Claims, 9 Drawing Sheets

Compositional Example of Access Network

FIG. 1 Compositional Example of Access Network

Compositional Example of Mobile Communication Terminal

ROUTER AND MOBILE COMMUNICATION TERMINAL FOR MOBILE COMMUNICATION NETWORK

BACKGROUND OF THE INVENTION

1. Field of the Invention

The present invention relates to a router provided in a mobile communication network and a mobile communication terminal which communicates with said router. Moreover, the present invention also relates to a mobile communication network system having a plurality of routers, and a communication method for the mobile communication network system.

2. Description of the Related Art

In recent years, mobile communication terminals (portable terminals) such as cellular phones, car telephones, Personal Digital Assistants (PDA), and the like, have become widespread, and the use of mobile communication services using such terminals has increased rapidly.

Moreover, the technology for providing mobile communication services is transferring from second-generation mobile communication systems, such as GSM, GPRS, PDC, PDC-P, and the like, or PHS systems, to third-generation mobile communication systems, such as IMT-2000, or small-scale radio access technology, such as wireless LAN, Bluetooth, and the like. Furthermore, investigation has started into an 'e-Japan' strategy for moving the technology for providing mobile communication services on further to the establishment of fourth-generation mobile communication technology that can realize a higher speed than IMT-2000.

By providing a plurality of mobile communication environments of different types in this way, the user is able to select the access network most suited to the user's (mobile communications terminal's) location, and the services that he or she wishes to use, so that mobile communication services can be used in a seamless fashion at any time and in any location.

These mobile communication environments are centred on the Internet, which provides high-speed, high-capacity communications, and are realized by means of the high-speed wireless Internet constituted by connecting a variety of wireless access networks to the Internet. Mobile IP is considered to be one of the key technologies in this high-speed wireless Internet.

"Mobile IP" is a protocol which allows communications to be performed in an IP network, whilst the mobile communication terminal changes its connection position on the network, and this protocol was standardized in RFC (Request For Comments) 2002 of the U.S. standardization body IETF (Internet Engineering Task Force).

On the other hand, with the rapid increase in the number of terminals present on IP networks in recent years, the problem of IP address depletion has aggravated. Therefore, the shift to networks using IPv6 which permits use of a larger number of IP addresses swings into full gear. Along with this, the standardization of mobile IPv6 as a protocol which supports movement of terminals on an IPv6 network, in place of mobile IP for an IPv4 network, is progressing, and the IETF is currently investigating RFC publication of same.

The basic mechanism of mobile IP and mobile IPv6 is the same, and therefore the prior art is described below taking mobile IPv6 as an example.

FIG. 8 shows the schematic configuration of an IPv6 network system. The IPv6 network system has a home network 100, Internet core network 200, and access networks 300 and 400.

The home network 100 is an IPv6 network to which a mobile communication terminal (mobile node, hereinafter called "MN") 500 is connected constantly (by wireless connection), and this communication network is owned and managed, for example, by the carrier (telecommunication operator, and particularly, primary telecommunication operator) to which the MN 500 is subscribed. The home network 100 has a home agent (hereinafter, "HA") 110 which is a movement management agent.

The access networks 300 and 400 are IPv6 networks owned and managed by a different carrier which is also capable of accommodating the MN 500. The access network 300 has routers 310 and 320, and the access network 400 has routers 410 and 420.

The Internet core network 200 is an IPv6 network, which is constituted by IPv6 routers (not illustrated). The home network 100, and the access networks 300 and 400 are connected to the Internet core network 200, and are able to communicate mutually via the Internet core network 200.

The MN 500 is usually connected to the home network 100 and performs radio communications therewith, and it also has a radio interface for communicating with the access network 300 (router 310 or 320) and access network 400 (router 410 or 420). Consequently, if the MN 500 moves outside the access area of the home network 100, and moves into the access area of the access network 300 or 400, then it performs radio communications with the access network 300 or 400, and accesses the HA 110 of the home network 100 by means of the Internet core network 200.

In this IPv6 network system, if the MN 500 moves from the access area of the home network 100 into the access area of the access network 300 (for example, the access area of router 320) (P1), then the MN 500 starts to connect to the access network 300, and establishes a radio connection with the router 320 (P2).

Thereupon, the MN 500 receives a router advertisement message transmitted by the router 320 (P3). The MN 500 detects that the network prefix (for example, (20::/64)) contained in the router advertisement message thus received is different from the network prefix (for example, (10::/64)) of the home network 100, and thus recognizes that it has left the home network 100.

Next, the MN 500 sends a registration message (hereinafter, called "BU" (Binding Update)), to the HA 110 of the home network 100, via the access network 300 and the Internet core network 200 (P4). This BU contains the home address (the IP address of the MN 500 in the home network 100, for example, (10::10)), and a care-of address (hereinafter, called "CoA") (for example, (20::10)). The CoA may be assigned to the MN 500 by the router 320 of the access network 300 or by an address allocation router, or it may be generated by the MN 500.

Upon receiving the BU, the HA 110 holds the relationship between the home address and CoA of the MN 500 for a prescribed period of time, as a binding cache (P5).

During the existence of the binding cache, packets (IPv6 packets) sent to the home address of the MN 500 are received by the HA 110, and then forwarded to the CoA of the MN 500. By means of this processing, the MN 500 is able to perform communications even when it moves about on the IPv6 network system.

This management of movement by mobile IPv6 is executed independently in the IPv6 layer by means of an extended header of the IPv6 packet or an extension to the ICMPv6 message, or the like, irrespectively of the type of lower physical layer or data link layer. This means that whatever the type of access network used by the MN 500, it is able to move about on the IPv6 network system.

Therefore, as described above, mobile IPv6 is excellently suitable as a technology for achieving a mobile environment which permits communications services to be used seamlessly, at any time and in any location.

However, with mobile IPv6 problems of the following kind arise when the MN 500 performs handover between different access networks.

The first problem is that during handover, there is a risk that packets will not be transmitted from the HA 110 to the MN 500, and hence packet loss will arise. This problem arises in the following manner.

Namely, if the MN 500 moves from the access area of the access network 300 to the access area of the access network 400 (P6), then according to this movement, the radio signal from the router 320 gradually becomes insufficient, and the connection with the access network 300 is disconnected.

On the other hand, the MN 500 starts connection with the access network 400 (for example, the router 410), and establishes connection therewith (P7). Thereby, the MN 500 receives the router advertisement message sent by the router 410 (P8).

The MN 500 detects that the network prefix contained in the router advertisement message thus received (for example, (30::/64)) is different to both the network prefix (10::/64) of the home network 100 and the network prefix (20::/64) of the access network 200, and hence it recognizes that it has moved. The MN 500 then sends its home address and a CoA (for example, (30::10)) obtained from the access network 400 as a BU to the HA 110, to register its position in the HA (P9).

Upon receiving the BU from the MN 500, the HA 110 stores the correspondence between the home address (10::10) and the new CoA (30::10) of the MN 500 as a binding cache (P10). Thereupon, whilst the binding cache exists, the HA 110 receives packets sent to the home address (10::10) of the MN 500, by proxy, and then forwards the received packets to the CoA (30::10) of the MN 500.

Here, if the connection between the MN 500 and the access network 300 is disconnected, then the packets sent to the MN 500 until registration of a new CoA (30::10) is completed in the HA 110 will be forwarded from the HA 110 to the CoA (20::10) obtained by the MN 500 from access network 300. However, these packets will not be received ultimately by the MN 500 and hence packet loss will occur.

A second problem also arises in that there is a risk of applications being disconnected.

In other words, normally, when establishing a connection with the access network 400, as in step P7, authentication is performed to check whether or not the MN 500 is a user having the right to use the access network 400. Due to this authentication, the time required to perform steps P6 to P10 becomes longer. Consequently, an application being executed between the MN 500 and the other communicating party will be disconnected.

As a method for resolving the first and second problems, it has been conceived that, during handover, rather than attempting to connect to the access network 400 after the connection with the access network 300 has been severed, the MN 500 should perform connection with both the access network 300 and the access network 400, as illustrated in FIG. 9.

In other words, in mobile IPv6 it is possible to register a plurality of CoA. By using this, MN500 monitors the radio signals with the access network 300 and access network 400 constantly, and even before the connection with the access network 300 is severed, MN500 establishes the connection with the access network 400 immediately as soon as the connection with the access network 400 becomes possible, and the CoA of the access network 400 is previously registered in the HA 110, whereby problems, such as packet loss and disconnection of applications, and the like, can be resolved.

However, with this method, since the MN 500 monitors the radio signals from both the access network 300 and the access network 400 constantly, the battery consumption of the MN 500 is increased.

Moreover, if the access areas of the access network 300 and the access network 400 are overlapping, then this means that both access networks will be used simultaneously. Consequently, there is a risk that the connection fee charged to the user will be doubled. For example, supposing that the access networks 300 and 400 are Internet Service Providers (ISP) having IMT-2000 and radio LAN access points, then situations where the access areas are overlapping in this way are liable to occur. Moreover, the access networks also end up using resources wastefully, and hence efficiency declines.

SUMMARY OF THE INVENTION

The present invention was devised in order to resolve problems of this kind, an object thereof being to achieve handover of high reliability and high efficiency, in an IP network.

A router according to a first aspect of the present invention is a router located in an end section of a communication area of a mobile communication network, comprising: a communication unit for performing radio communications with a mobile communication terminal; and a transmission unit for sending a message indicating that it is located in the end section of said communication area to said mobile communication terminal.

According to the first aspect of the present invention, the router located in an end section of the communication area sends the message indicating that it is located at the end section of the communications area, to a mobile communications terminal. Thereby, the mobile communication terminal recognizes that it needs to perform handover to another communication network, and hence it is able to start communication with a router of another communication network, before the connection with the router with which it is currently communicating is severed. Accordingly, it is possible to prevent packet loss and disconnection of applications during handover.

Moreover, the mobile communication terminal can be set so that it does not perform a connection with another communication network, until it receives said message. Thereby, it is possible to reduce the fee charged by the carrier of the other communication network to the mobile communications terminal.

In this way, according to the first aspect of the present invention, it is possible to achieve handover of high reliability and good efficiency.

A mobile communication terminal according to a second aspect of the present invention is a mobile communication terminal comprising: a first communication unit for performing radio communications with at least one of a plurality of routers provided in a first mobile communication network; a second communication unit for performing radio communications with at least one of a plurality of routers provided in a second mobile communication network; and a control unit for controlling said second communication unit so that said second communication unit initiates communications with said router provided in said second mobile communication network, whilst said first communication unit is communicating with a router located in an end section of a communication area of said first mobile communication network, upon receiving a message sent by said router located in said end section, said message indicating that said router is located in the end section.

According to the second aspect of the present invention also, it is possible to achieve similar beneficial effects to those of the first aspect described above.

A mobile communication network system according to a third aspect of the present invention is a mobile communication network system comprising a first mobile communication network having a plurality of routers, a second mobile communication network having a plurality of routers, and a mobile communication terminal; wherein, of the plurality of routers of said first mobile communication network, a router located in an end section of a communication area of said first mobile communication network comprises a transmission unit for sending an end message indicating that it is located in the end section of said communication area, to said mobile communication terminal, and said mobile communication terminal comprises: a first communication unit for performing radio communications with at least one of the plurality of routers of said first mobile communication network; a second communication unit for performing radio communications with at least one of the plurality of routers provided in said second mobile communication network; and a control unit for controlling said second communication unit so that said second communication unit initiates communications with said router provided in said second mobile communication network, whilst said first communication unit is communicating with the router located in the end section of the communications area of said first mobile communication network, upon receiving the end message sent by said router located in said end section.

A communication method according to a third aspect of the present invention is a communications method in a mobile communication network system comprising a first mobile communication network having a plurality of routers, a second mobile communication network having a plurality of routers, and a mobile communication terminal, comprising steps of: in a router located in an end section of a communication area of said first mobile communication network, of the plurality of routers of said first mobile communication network, sending an end message indicating that said router is located in the end section of said communication area, to said mobile communication terminal; and in said mobile communication terminal, initiating communications with a router provided in said second mobile communication network, whilst said mobile communication terminal is communicating with the router located in the end section of the communication area of said first mobile communication network, upon receiving said end message sent by said router located in said end section.

According to the third aspect of the present invention also, it is possible to achieve similar beneficial effects to those of the first aspect described above.

DESCRIPTION OF THE PREFERRED EMBODIMENTS CONFIGURATION OF ACCESS NETWORK SYSTEM

Figure 1:
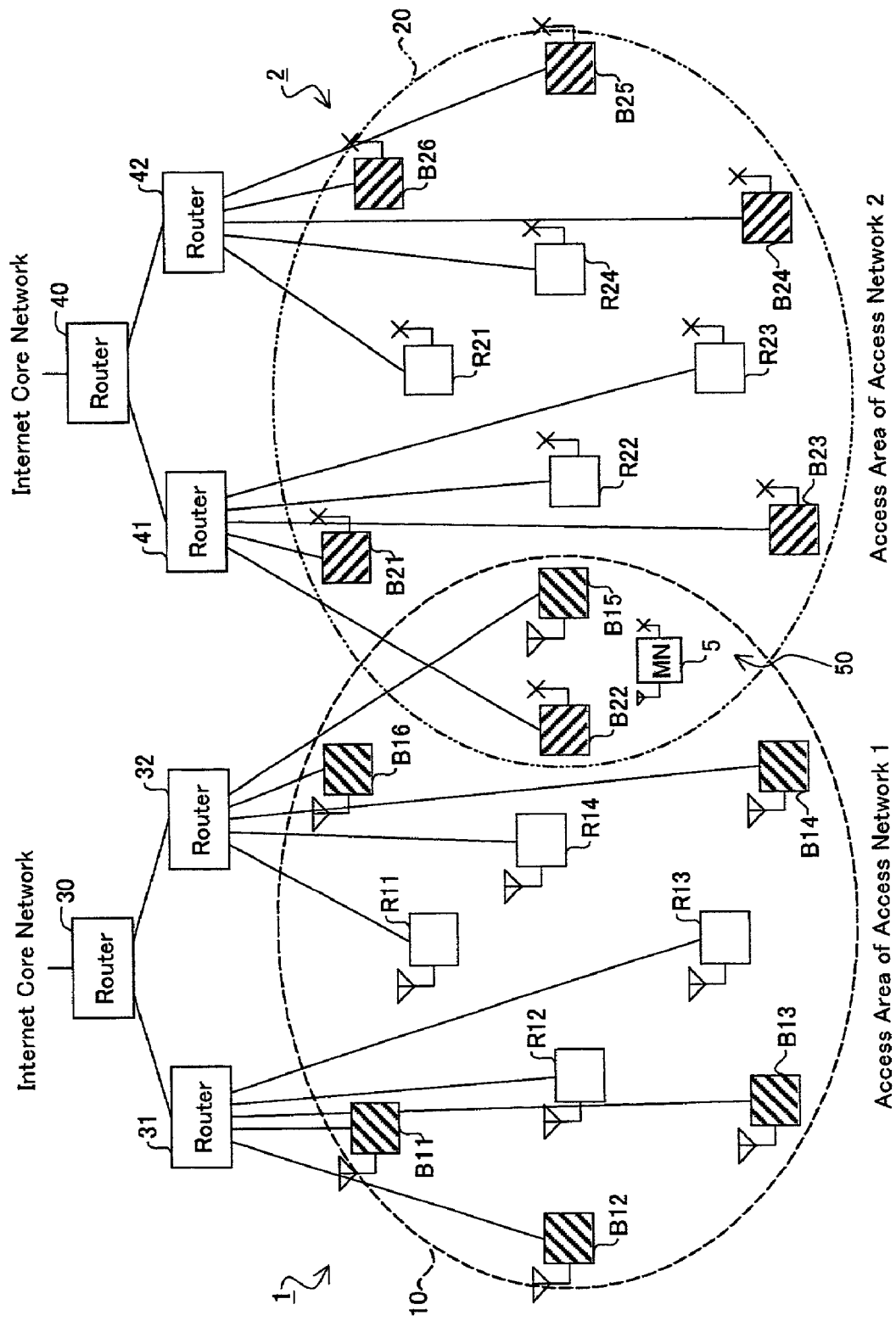
FIG. 1 is a block diagram showing a compositional example of an access network system in an embodiment of the present invention.

FIG. 1 is a block diagram showing a compositional example of an access network system in an embodiment of the present invention. The access network system in the present embodiment is an IPv6 network system.

This access network system comprises access networks 1 and 2, routers 30 to 32 and 40 to 42, an Internet core network (not illustrated) and a home network (not illustrated).

The home network is an IPv6 network owned and managed by the carrier (telecommunication operator, and especially, primary telecommunication operator) H. The access network 1 is an IPv6 network owned and managed by a different carrier A to the carrier H. The access network 2 is an IPv6 network owned and managed by a different carrier B to the carriers H and A.

The mobile communication terminal (mobile node, MN) 5 is, for example, a cellular phone, car telephone, personal digital assistant (PDA), or the like, and is a terminals which is subscribed to the carrier H of the home network. Therefore, the MN 5 has a home address on the home network.

The MN 5 also has a communication interface with the access networks 1 and 2, as well as with the home network. Consequently, although the MN 5 normally performs communications by accessing the home network, if it moves, then it may also connect to the access network 1 or 2 and perform communications via same. In this case, a home agent (HA, not illustrated), which is a movement management agent provided in the home network, manages the position of the MN5, packet transmission to and from same, and the like.

The access network 1 has routers B11 to B16 and R11 to R14. These routers are mutually connected by means of wired links or wireless links (not illustrated).

The routers B11 to B16 and R11 to R14 each perform radio communication with the MN 5 by means of IPv6 or mobile IPv6. An access area 10 (indicated by the broken line), being a region in which communication with the access network 1 is possible, is formed by the routers B11 to B16 and R11 to R14, and when the MN 5 is inside this access area 10, it is able to communicate by establishing a connection with at least one of these routers.

The routers B11 to B16 are positioned at the ends of the access area 10 (boundaries of the access area 10 with other areas). If the MN 5 is in a state where it has established a radio connection with any one of the routers B11 to B16 and it then moves in a direction away from the access area 10, then the connection with the access network 1 will be severed. These routers B11 to B16 advertise to the MN 5 information indicating that the routers B11 to B16 are positioned in the end sections of the access area (end message), in addition to the standard IPv6 and mobile IPv6 protocol processing. This end message and the advertising thereof are explained later.

The routers R11 to R14 are routers positioned outside the ends of the access area 10, and are standard IPv6 routers executing IPv6 and mobile IPv6 protocol processing. Therefore, detailed description thereof is omitted here.

The access network 2 has routers B21 to B26 and R21 to R24. These routers are mutually connected by means of wired links or radio links (not illustrated).

The routers B21 to B26 and R21 to R24 each perform radio communications with the MN 5 by means of IPv6 and mobile IPv6. The routers B21 to B26 and R21 to R24 form an access area 20 of the access network 2 (indicated by the double-dotted broken line in the diagram), and when the MN 5 is inside this access area 20, it is able to perform communications by establishing a radio connection with at least one of these routers.

The routers B21 to B26 are positioned at the ends of the access area 20 (boundaries of the access area). If the MN 5 is in a state where it has established radio communications with any one of the routers B21 to B26 and it then moves in a direction away from the access area 20, then the connection with the access network 2 will be severed. These routers B21 to B26 advertise to the MN 5 an end message indicating that the routers B21 to B26 are positioned in the end sections of the access area, in addition to the standard IPv6 and mobile IPv6 protocol processing. This end message and the reporting thereof are explained later.

The routers R21 to R24 are located outside the end sections of the access area 20, and are standard IPv6 routers executing IPv6 or mobile IPv6 protocol processing. Therefore, detailed description thereof is omitted here.

Between access area 10 and access area 20, there exists an area 50 where the two access areas are overlapping. In this area 50, the MN 5 is able to conduct communications by establishing a connection with either both or one of the access networks 1 and 2.

The routers 30 to 32 are standard IPv6 routers, and in the present embodiment, they function as relay routers between the access network 1 and the Internet core network. Similarly, the routers 40 to 42 are also standard IPv6 routers, and in the present embodiment, they function as relay routers between the access network 2, the Internet core network and the home network.

In this access network system, if the MN 5 moves outside the access area of the home network and into the access area 10 of the access network 1 or the access area 20 of the access network 2, then as explanation in the description of the prior art, processing based on mobile IPv6 is executed and a binding cache to the HA of the home network is created. The home address of the MN 5, and the care-of address (CoA) for the access network 1 or 2 are registered in corresponding fashion in this binding cache. While the binding cache exists, any packet addressed to the MN 5 will be first received by the HA and then forwarded by the HA to the MN 5.

Figure 2:
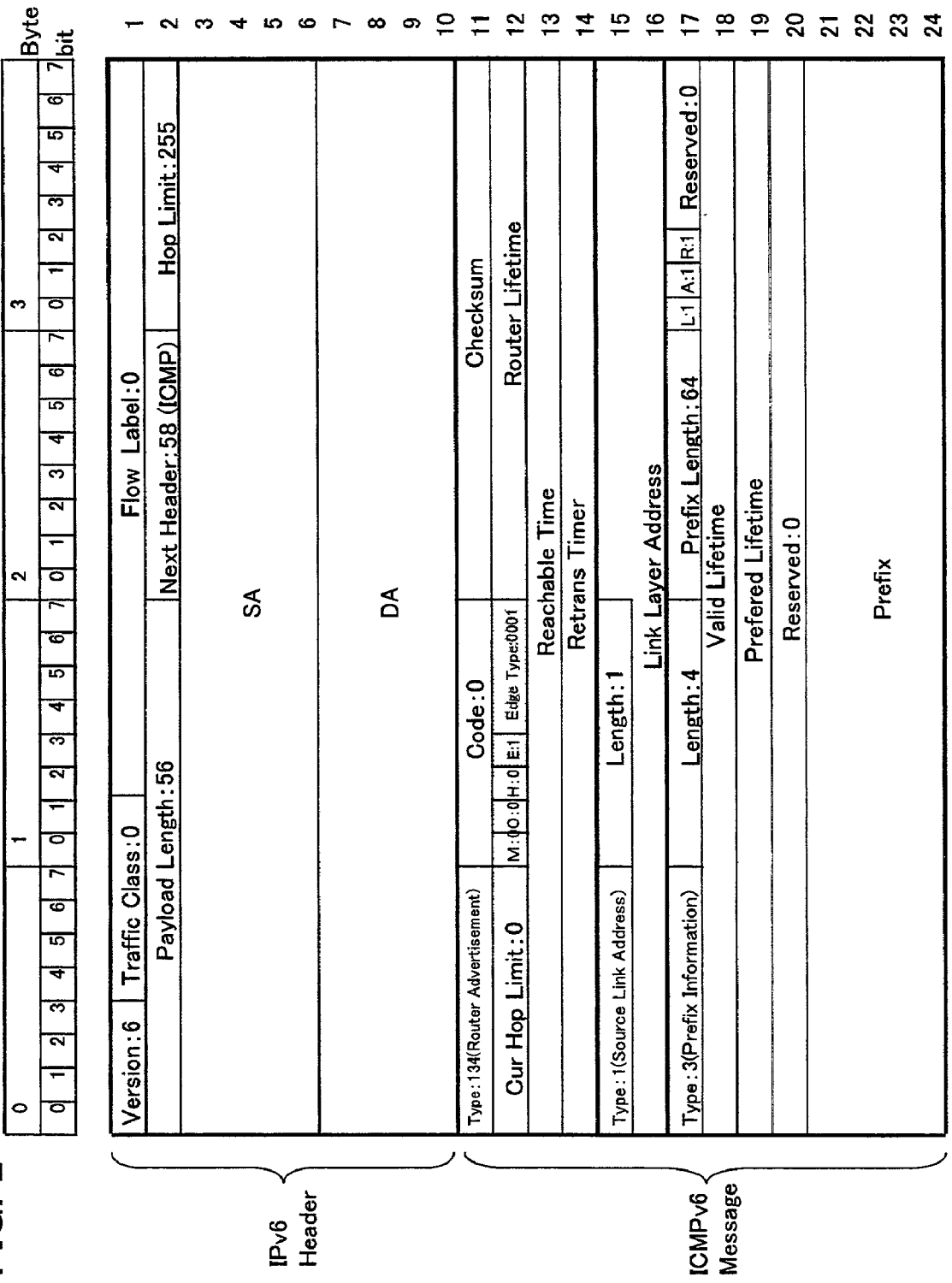
FIG. 2 shows an example of the composition of an end message.

In addition to this, in the present embodiment, the routers B11 to B16 and B21 to B26 positioned at the ends of the access areas 1 and 2 send an end message to the MN 5 indicating that the routers are located in the end sections of the access area. In the present embodiment, this end message takes the form, for example, of an extension to the router advertisement message, which is one of the ICMPv6 messages. FIG. 2 shows an example of the composition of an end message.

The end message is generated by providing two fields comprising a flag E indicating an end section, and an end type (Edge Type), in the unused reserved section of the standard router advertisement message. The other sections apart from these contain the same data contents as a standard router advertisement message.

This reserved section is constituted by the least significant 5 bits of the 6th byte from the start of the ICMPv6 message. In a standard router advertisement message, these 5 bits are set to 0. The first bit of this reserved section is used for the flag E, and the subsequent 4 bits are used for the Edge Type.

If the flag E is set to 1, then this indicates that the router sending the router advertisement message is positioned in the end section of the access area of the access network to which that router belongs, whereas if the flag E is 0, then this indicates that it is a normal router which is not positioned in the end section of the access area.

The Edge Type indicates the type of the end section. For example, in the case of hierarchical IPv6 one access network can be divided into layers to create a plurality of sub-networks (or specific areas within an access network). In a hierarchical IPv6 of this kind, it is necessary to distinguish whether an end section is an end section of a sub-network, or an end section of the access network. In this case, the Edge Type is used. For example, if the Edge Type is 1, then this indicates the end section of an access network, and if the Edge Type is 2, then this indicates the end section of a sub-network or a specific area within an access network. By providing the Edge Type in this way, the edge messages are applicable to hierarchical IPv6.

If the access network is not hierarchical, then the Edge Type is set to 0, for example, and it is determined whether an area is an end section of an access network, by means of flag E only.

In the present embodiment, since the end message is one of the router advertisement messages, it may be sent at uniform time intervals by the router, or it may be sent by the router upon receipt by the router of a router solicitation sent by the MN 5.

As described hereinafter, until the MN 5 receives an end message from a router (for example, router B15) of a particular access network (for example access network 1), the MN 5 does not detect the radio signals from another access network (for example, access network 2) and does not perform connection with that other access network. Upon receiving an end message, the MN5 detects the radio signals from the other access network and establishes a connection with the other access network.

For instance, if the MN 5 is connected to access network 1 in area 50, then until it receives an end message from router B15 of the access network, the MN 5 does not connect to access network 2 (routers B22, R22, and the like), but upon receiving an end message from router B15, it establishes a connection with access network 2.

By this means, the first and second problems described above in relation to the prior art are resolved. Moreover, compared to a case where the MN 5 is connected constantly to both access networks 1 and 2, the power consumption of the MN 5 is reduced, and the increase in fees is also reduced, in addition to which, the use efficiency of the access network resources is also improved.

Below, the detailed composition of the routers B11 to B16, B21 to B26, and node MN 5 used to achieve processing of this kind is now described, along with the relevant processing sequences.

Composition and Operation of Routers

Figure 3:
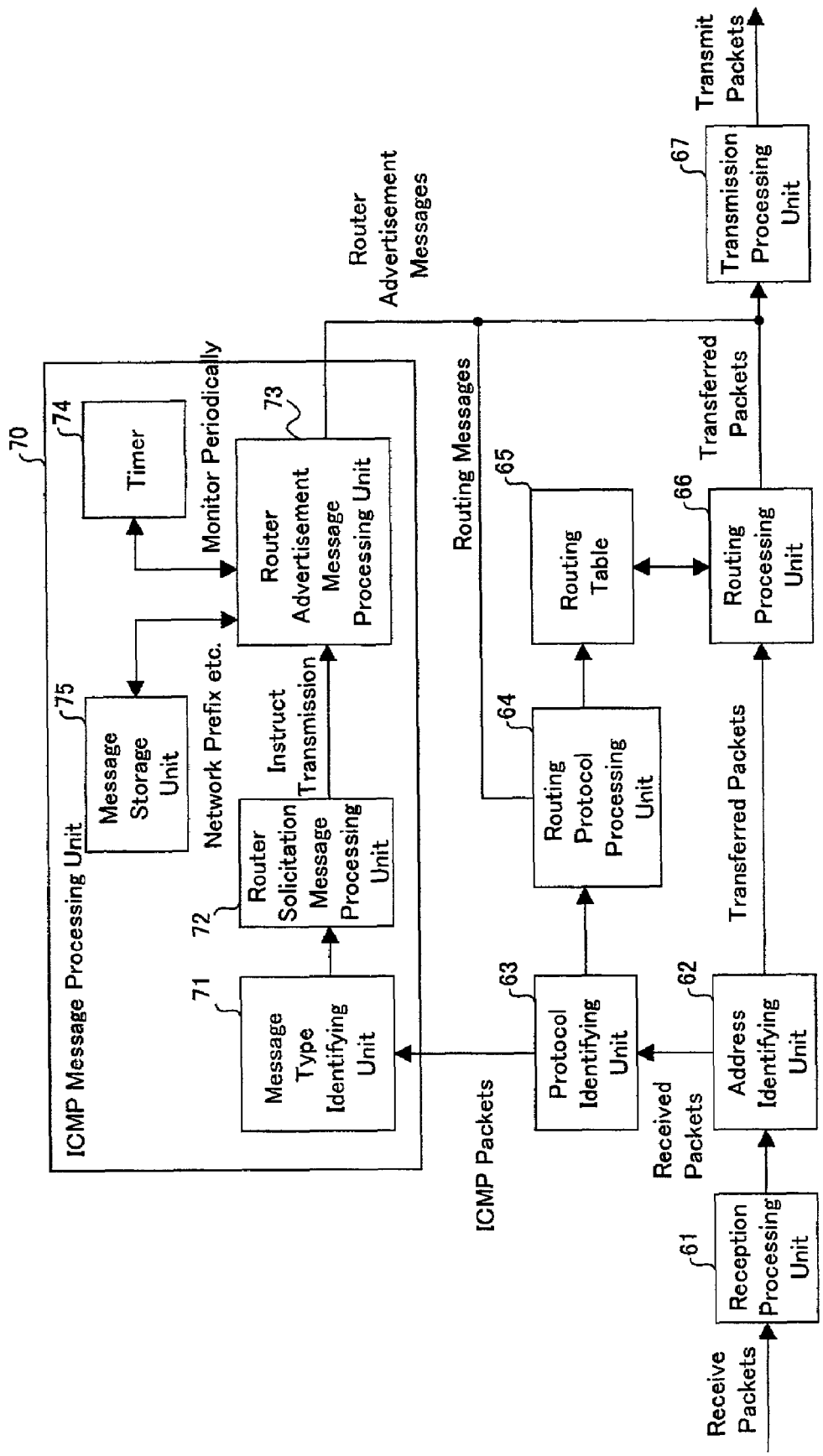
FIG. 3 is a block diagram showing a compositional example of the routers B11 to B16 and B21 to B26 positioned at the ends of an access area.

FIG. 3 is a block diagram showing a compositional example of the routers B11 to B16 and B21 to B26 positioned at the ends of an access area. The routers B11 to B16 and B21 to B26 each have the same composition, so the composition of router B11 is now described as a representative example thereof.

The router B11 has a reception processing unit 61, address identifying unit 62, protocol identifying unit 63, routing protocol processing unit 64, routing table memory unit 65, routing processing unit 66, transmission processing unit 67, and ICMP message processing unit 70. The ICMP message processing unit 70 has a message type identifying unit 71, router solicitation message processing unit 72, router advertisement message processing unit 73, timer 74, and message storing unit 75.

Data sent by the MN 5 or other router (IPv6 packet or frame including IPv6 packet) is received by the reception processing unit 61 via an antenna (not illustrated) or input port (not illustrated) of the router B11. The reception processing unit 61 then executes the processing of the layer 1 (physical layer) and layer 2 (data link layer or interface layer) or the like on the data sent by the MN 5. The processed data is then supplied to the address identifying unit 62.

If data is received by a radio signal from the MN5, then the reception processing unit 61 carries out processing, such as frequency conversion from RF band to baseband, or the like, on the radio signal, and then supplies the processed packets to the address identifying unit 62. Moreover, the reception processing unit 61 also removes the frame header from the frame, extracts the IPv6 packet, and supplies the extracted IPv6 packet to the address identifying unit 62.

The address identifying unit 62 analyses the destination address of the packet supplied from the reception processing unit 61 and determines whether or not the packet is one addressed to that router (including multi-cast and broadcast packets), on the basis of the destination address. If the address identifying unit 62 identifies the packet as being addressed to that router, then it takes the packet to be a reception packet and supplies it to the protocol identifying unit 63, whereas if the packet is not one addressed to that router, then it is taken to be a forwarding packet and it supplied to the routing processing unit 66.

For example, since a router solicitation includes a multi-cast address as a destination address, then the router solicitation is supplied by the address identifying unit 62 to the protocol identifying unit 63.

The routing processing unit 66 references a routing table stored in the router table memory unit 65 and performs routing processing on the forwarding packet supplied by the address identifying unit 62, whereupon the forwarding packet is supplied to the transmission processing unit 67.

The protocol identifying unit 63 identifies the protocol on the basis of the next header value of the reception packet, and determines whether the reception packet is a routing message or an Internet control message protocol (ICMP) packet (ICMPv6 packet).

If the protocol identifying unit 63 recognizes the reception packet to be a routing message, then it supplies the reception packet to the routing protocol processing unit 64, whereas if the reception packet is an ICMP packet, then it is supplied to the message type identifying unit 71 of the ICMP message processing unit 70. For example, since the next header value of a router solicitation indicates ICMP, a router solicitation is supplied to the message type identifying unit 71 by the protocol identifying unit 63.

The routing protocol processing unit 64 generates a routing table according to routing messages supplied by the protocol identifying unit 62, and stores the generated routing table in the routing table storing unit 65. Moreover, the routing protocol processing unit 64 generates a routing message to be sent to the other routers, and supplies the generated routing message to the transmission processing unit 67.

The message type identifying unit 71 identifies the type of ICMP packet supplied by the protocol identifying unit 63, on the basis of the Type value. For example, if the Type value indicates a router solicitation, then the message type identifying unit 71 supplies the ICMP packet to the router solicitation message processing unit 72.

The router solicitation message processing unit 72 instructs transmission of a router advertisement message to the router advertisement message processing unit 73, on the basis of the ICMP packet supplied by the message type identifying unit 71.

The message storing unit 75 stores the network prefix of the access network 1 to which that router belongs, as well as data indicating that that router is located in an end section of an access area.

Upon receiving a transmission instruction from the router solicitation message processing unit 72, the router advertisement message processing unit 73 generates an end message (router advertisement message) on the basis of the network prefix and the data indicating the location in an end section stored in the message storing unit 75, and this end message is supplied to the transmission processing unit 67.

On the other hand, when the router advertisement message processing unit 73 does not receive a router solicitation (in other words, if it does not receive a transmission instruction from the router solicitation message processing unit 72), it generates an end message at prescribed time intervals (for example, at 30 second intervals), using a timer 74, and this end message may be supplied to the transmission processing unit 67.

The transmission processing unit 67 carries out processing of the layer 1 and 2 protocol, or the like, on packets (messages) supplied by the routing processing unit 66, the routing protocol processing unit 64, or the router advertisement message processing unit 73, and then sends the processed packet to the MN 5 or other router.

Figure 4A:
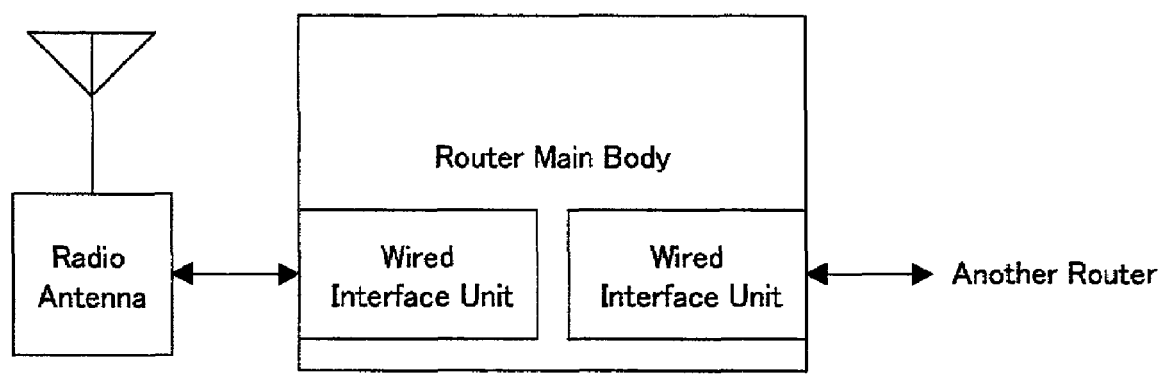
FIGS. 4A and 4B are block diagrams showing compositional examples of the route and antenna.
Figure 4B:
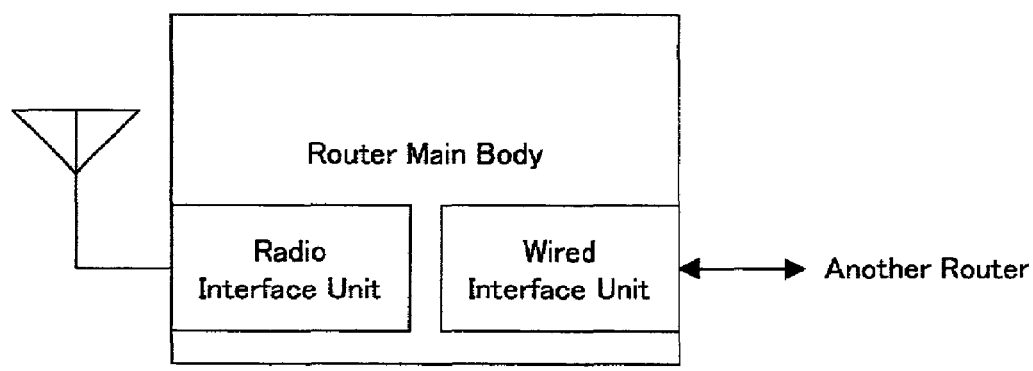

The composition illustrated in FIG. 4A or the composition illustrated in FIG. 4B may be used for the composition of the router R11 and antenna. In FIG. 4A, a router main body and a radio antenna are provided in independent fashion, the router main body and the radio antenna being connected via a wired interface unit and wired cable. In FIG. 4B, the router main body and the radio antenna are formed in integral fashion, a radio interface unit being provided inside the router main body, and a radio antenna being connected to this radio interface unit.

Composition and Operation of Mobile Communication Terminal

Figure 5:
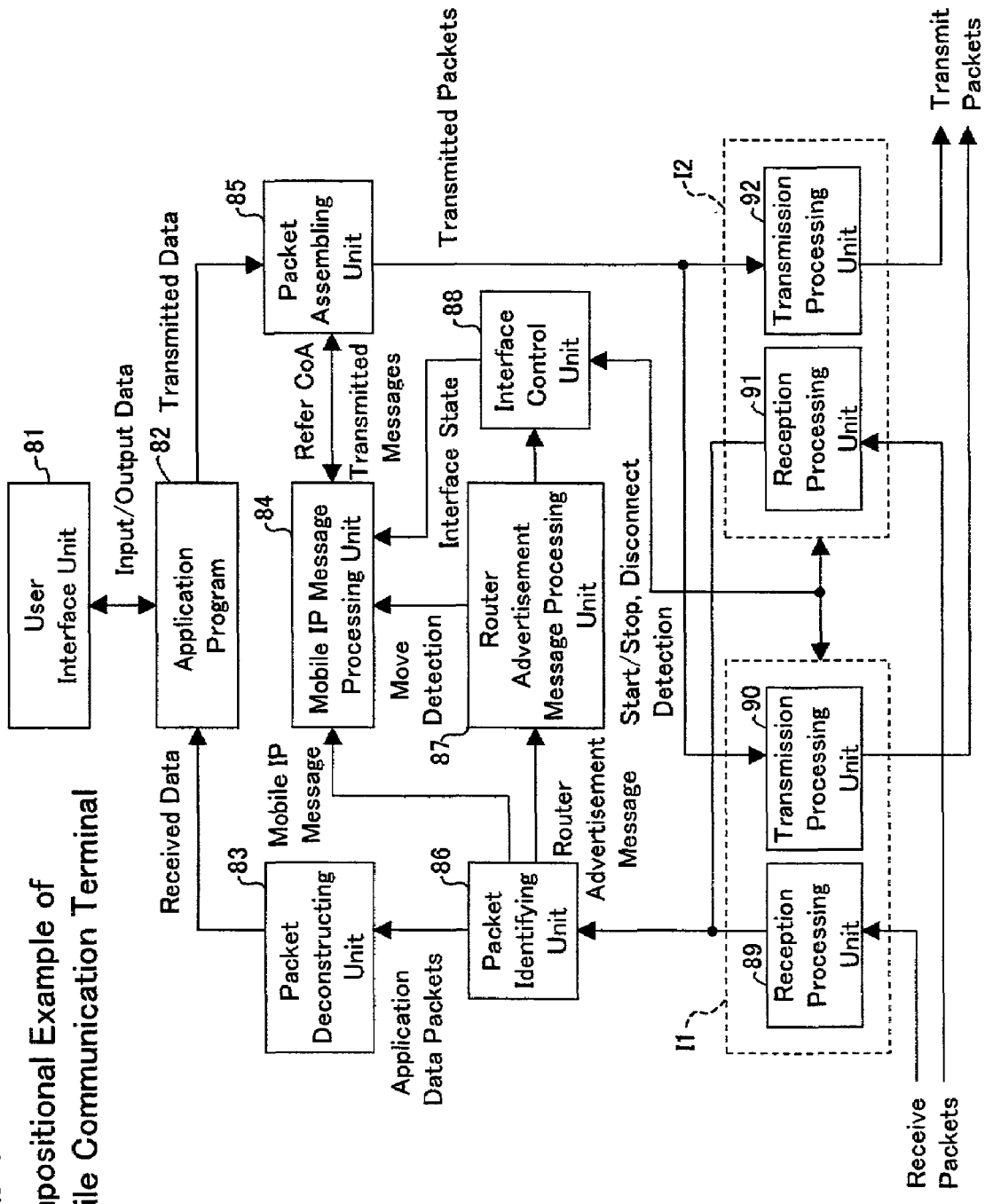
FIG. 5 is a block diagram showing a compositional example of the MN 5.

FIG. 5 is a block diagram showing a compositional example of the MN 5. The MN 5 comprises: a user interface unit 81, application program executing unit 82, packet deconstructing unit 83, mobile IP message processing unit 84, packet assembling unit 85, packet identifying unit 86, router advertisement message processing unit 87, interface control unit 88, reception processing units 89 and 91, and transmission processing units 90 and 92.

The reception processing unit 89 and transmission processing unit 90 constitute a communications interface unit I1 for conducting communications with routers of the access network 1. The reception processing unit 91 and the transmission processing unit 92 constitute a communications interface unit I2 for conducting communications with routers of the access network 2.

The start-up and stop operations of the communication interface units I1 and I2 are controlled by the interface control unit 88. If the MN 5 is located inside access area 10, the communication interface unit I1 is started up, and if the MN 5 is located inside the access area 20, then the communication interface unit I2 is started up. Inside the area 50, both communication interface units I1 and I2 are started up by means of reception of an end message.

It is also possible to provided three or more communication interface units. Moreover, for the communication interface unit used to perform communication with the home network, it is possible to make use of either communications interface unit I1 or I2, or a further communication interface unit (not illustrated) may be provided.

Data sent from a router of access network 1 (IPv6 packet or frame including IPv6 packet) is received by the reception processing unit 89. Data sent from a router of access network 2 is received by the reception processing unit 91.

The reception processing units 89 and 91 executes layer 1 and 2 protocol processing on the received data. For example, they execute processing for converting the frequency of the radio signal from a RF band to a baseband. Moreover, they remove the frame header from the frame, extract the IPv6 packet. After executing this processing, the reception processing units 89 or 91 supply the reception packets to the packet identifying unit 86.

The packet identifying unit 86 determines whether or not the reception packet is a router advertisement message (including end message), an ICMP message (mobile IP message) other than a router advertisement message, or an application data packet, by means of the next header value and type value in the reception packet. Application data packets may be, for example, text data, image data, sound data, program data, and the like.

If the packet identifying unit 86 recognizes the reception packet to be a router advertisement message (in other words, if the next header value is ICMP, and the type is router advertisement), then it supplies the reception packet to the router advertisement message processing unit 87, whereas if the reception packet is a mobile IP message, then it supplies the reception packet to the mobile IP message processing unit 84, and further, if the reception packet is an application data packet, then it supplies the reception packet to the packet deconstructing unit 83.

The router advertisement message processing unit 87 compares the network prefix of the router advertisement message supplied by the packet identifying unit 86 with the network prefix of the previously received router advertisement message.

If the two network prefixes are matching, then the router advertisement message processing unit 87 judges that there is no movement of the MN 5 between routers. Whereas if the two network prefixes are not matching, then it judges that the MN 5 has moved between routers, and supplies this movement detection to the mobile IP message processing unit 84.

Furthermore, the router advertisement message processing unit 87 determines whether or not the router advertisement message is an end message (in other words, whether or not the flag E is 1,). If it is an end message, then a notification that an end message has been received is reported to the interface control unit 88.

Upon receiving the report from the router advertisement message processing unit 87, the interface control unit 88 starts up the communication interface unit which is currently stopped. For example, when the MN 5 enters from access area 10 into area 50, the communication interface unit I1 is in active sate and the communication interface unit I2 is in non-active state. In this state, in area 50, when the MN 5 receives an end message from router B15, then the interface control unit 88 starts up communication interface unit I2.

Furthermore, the interface control unit 88 notifies the mobile IP message processing unit 84 of the interface state. The interface state indicates the start-up or stop state of the communication interface units I1 and I2.

The activated communication interface unit I2 establishes connection with the access network 2 and executes reception processing and transmission processing with access network 2.

The mobile IP message processing unit 84 updates the CoA on the basis of the network prefix of the received router advertisement message. The mobile IP message processing unit 84 then assembles the contents of a BU message and supplies the assembled message contents to the packet assembling unit 85.

The packet deconstructing unit 83 extracts the header section of a application data packet received from the packet identifying unit 86, and supplies the data contained in the payload section (data section) thereof to the application program executing unit 82.

The user interface unit 81 has, for example, input keys, a microphone, CCD camera, and the like, as input devices, and a liquid-crystal display, speakers, and the like, as output devices. The user interface unit 81 supplies data input by the user to the application program executing unit 82, and it outputs data supplied by the application program executing unit 82, to the output devices.

The application program executing unit 82 executes an application program stored previously in the MN 5 or an application program received by means of the packets, and processes the data sent by the packet deconstructing unit 83 and the user interface unit 81. The application program executing unit 82 then supplies the data to be output to the user, from the processing result data, to the interface unit 81, and supplies data to be sent to the other MN, or the like, to the packet assembling unit 85.

The packet assembling unit 85 applies a header, or the like, to the data supplied by the application program executing unit 82, or the message contents supplied by the mobile IP message processing unit 84, and generates a transmission packet, which it then supplies to the transmission unit 90 or 92.

The transmission processing unit 90 or 92 executes layer 1 and 2 protocol processing, and then sends the transmission packet.

Processing Sequence

Figure 6:
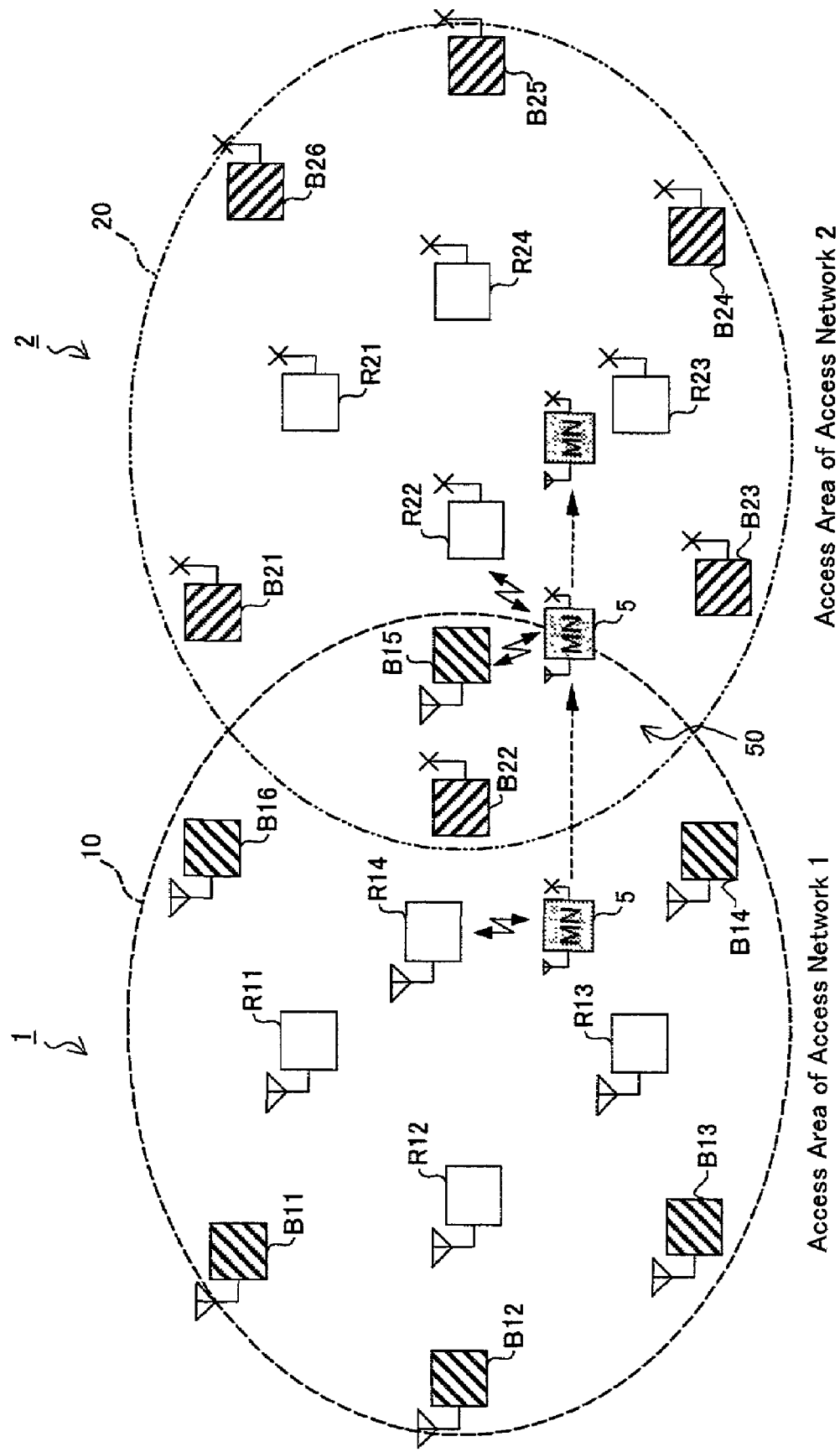
FIG. 6 illustrates the movement of the MN 5 on the access network system according to the present embodiment, and the state of the connection of the MN 5 with access network 1 or 2.
Figure 7:
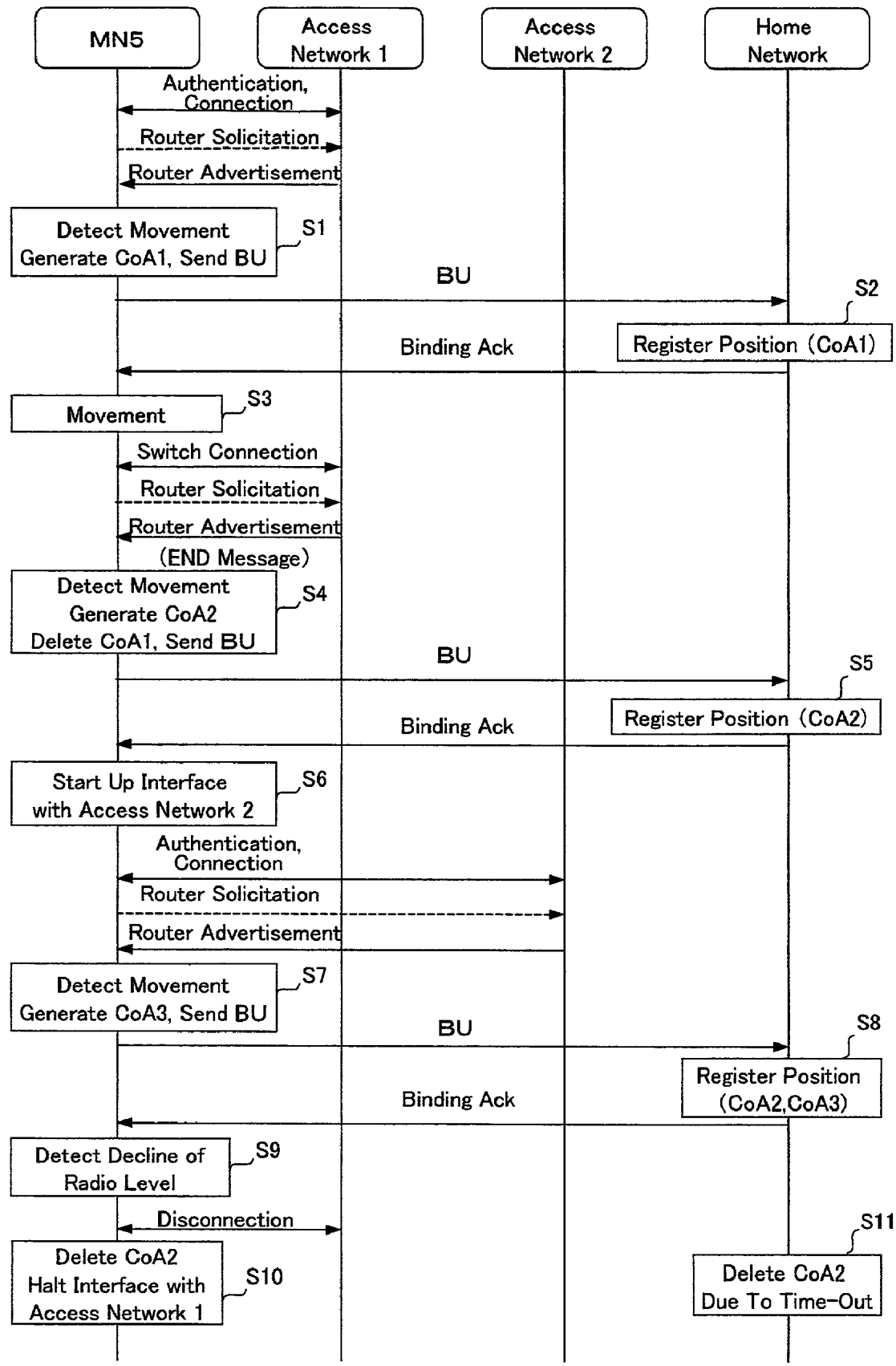
FIG. 7 is a sequence diagram showing the flow of processing in the MN 5, the access network 1 and 2, and the home network, in the situation illustrated in FIG. 6.
Figure 8:
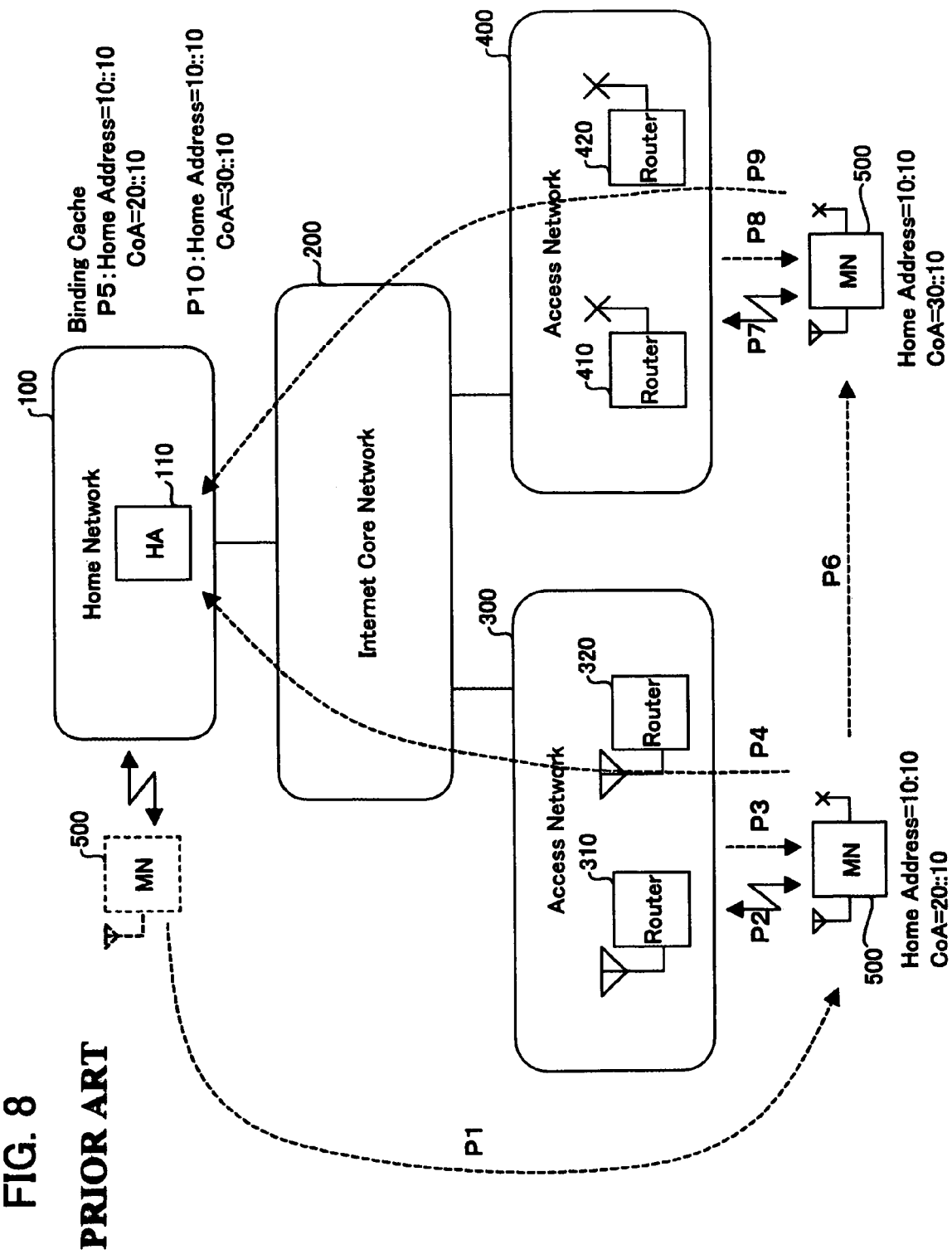
FIG. 8 shows the schematic configuration of an IPv6 network system.
Figure 9:
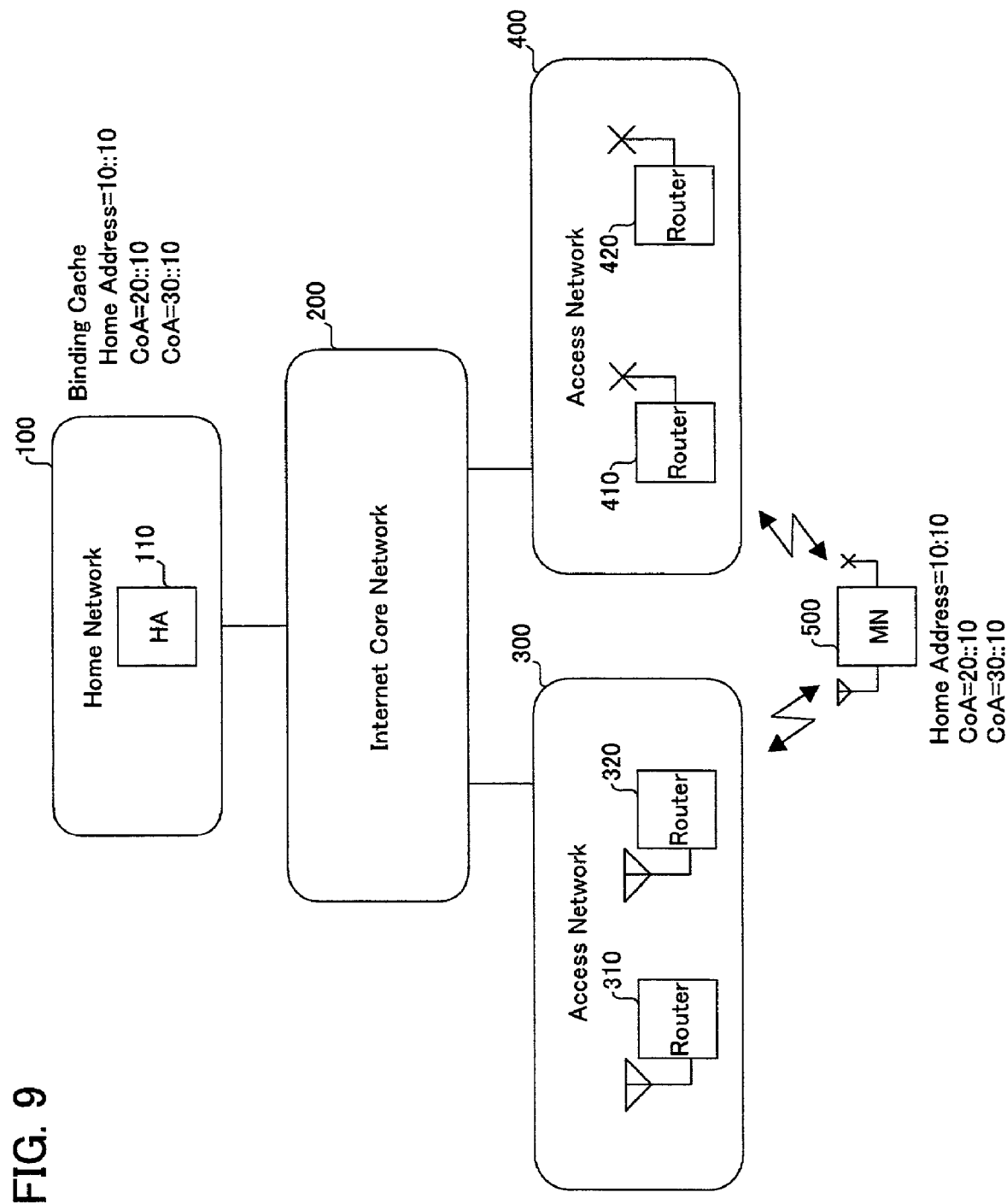
FIG. 9 shows the state in which a mobile communication terminal connects two access networks.

FIG. 6 illustrates the movement of the MN 5 on the access network system according to the present embodiment, and the state of the connection of the MN 5 with access network 1 or 2. FIG. 7 is a sequence diagram showing the flow of processing in the MN 5, the access network 1 and 2, and the home network, in the situation illustrated in FIG. 6.

If the MN 5, with the power switched off, moves from the access area of the home network to the access area of access network 1 (the vicinity of router R14 in FIG. 6), whereupon the power supply is switched on, then the MN 5 starts a radio link connection with the router R14 of the access network 1. In this case, the MN 5 starts up the communication interface unit I1 (see FIG. 4) in order to execute transmission and reception processing with respect to access network 1.

It is decided which one of the communication interface units I1 and I2 to start up on the basis of the frequency of the received radio signals, for example, if the radio frequencies of the access networks 1 and 2 are different. Moreover, in the case of this connection, the router R14 may perform authentication of the MN 5.

After establishing a radio link connection, the MN 5 receives a router advertisement message from router R14. As stated above, the router advertisement message may or may not be sent automatically at prescribed time intervals by the router R14. In the latter case, the router advertisement message is sent by the router R14 when the MN 5 sends a router solicitation to the router R14.

The MN 5 then analyses the router advertisement message from the router R14. Since the router R14 is a standard IPv6 router, the flag E in the router advertisement message from router R14 has a value of 0. Consequently, the MN 5 does not execute processing for detecting electromagnetic waves (radio signals) from another access network 2, and starting up a radio link connection therewith, and the like.

From the value of the network prefix contained in the router advertisement message of the router R14, the MN 5 detects that it has moved from the home network to access network 1 (S1). Thereby, the MN 5 generates a CoA (taken as 'CoA1'), and sends a BU containing the generated CoA1 to the HA of the home network, via the access network 1, routers 30 and 32 (see FIG. 1), and the Internet core network (S1).

In the example described here, the MN 5 generates CoA1, but it is also possible for CoA1 to be generated by router R14 or another router of the access network 1, and then supplied to MN 5.

Upon receiving the BU from MN 5, the HA performs positional registration of the MN 5 on the basis of the received BU (S2). In other words, the HA holds the relationship between the home address of the MN 5 and CoA1, in a binding cache. After registration, the HA returns a binding acknowledgement to the MN 5.

Thereby, transmitted packets addressed to the MN 5 will be received by the HA and then forwarded by the HA to the MN 5.

Subsequently, the MN 5 moves in the rightward direction in the diagram, and enters into the area 50 where access areas 10 and 20 overlap (S3). In this case, the MN 5 passes through the communication area of the router B22 of the access network 2. However, since the MN 5 has not yet received an end message from the router B15 and the communication interface unit I2 of MN 5 is in an halt state, the radio signal from the router B22 is not received by the MN 5.

The MN 5 moves further and enters into the area of both router B15 of access network 1 and router B22 of access network 2 (S3). Thereby, the MN 5 receives radio signals from the router B15 belonging to the same access network 1 as the router R14. If the reception level of the radio signal from the router B15 is greater than the reception level of the radio signal from router R14, then the MN 5 switches its radio link connection from router R14 to router B15.

After switching, the MN 5 receives a router advertisement message from the router B15. This router advertisement message may be sent in response to the MN 5 sending a router solicitation to the router B15.

The MN 5 detects movement by means of the network prefix contained in the router advertisement message (S4). Thereby, the MN 5 generates a CoA which is different to CoA1 (taken as 'CoA2'), and it sends a BU to the HA, whilst also deleting CoA1 (S4).

Upon receiving the BU from the MN 5, the HA performs position registration of the MN 5 on the basis of the received BU (S5). After registration, the HA returns a Binding Acknowledgement to the MN 5.

Moreover, since the router B15 is located in an end section of the access area 10, the flag E of the router advertisement message from router B15 is set to 1. In other words, this router advertisement message is also an end message. Accordingly, the MN 5 starts up the communication interface unit I2 (S6).

The communication interface unit I2 selects the radio signal from the router of access network 2 (in FIG. 5, router R22), and establishes a connection with router R22. Thereby, handover is initiated. Authentication may be performed during this connection process.

After establishing a connection, the MN 5 receives a router advertisement message form the router R22. This router advertisement message may also be sent in response to a router solicitation from MN 5.

From the network prefix of the router advertisement message sent by the router R22, the MN 5 detects that it has moved from the access network 1 to access network 2, and it generates a new CoA3 (S7). The MN 5 then sends a BU to the HA (S7), and performs position registration (S8).

In this state, since the MN 5 is also maintaining a connection with the router B15, the MN 5 has two CoA registered in the HA, namely, CoA2 and CoA3. Moreover, CoA2 is not deleted in the MN 5, either.

Accordingly, packets addressed to the MN 5 are forwarded by the HA to both CoA2 (via router B15) and CoA3 (via router R22). In this way, connection to access network 2 is initiated in preparation for the subsequent handover, whilst a connection with access network 1 remains established. Therefore, even if the connection with access network 1 is subsequently disconnected, packet loss and disconnection of applications can be avoided.

Rather than performing connection to the access network 2 immediately upon entering area 50, the MN 5 connects to the access network 2 after it has received an end message from router B15. Consequently, it is possible to shorten the period of time during which the MN 5 is connected to both access networks 1 and 2, and hence the increase in charges to the user (MN 5) can be reduced, and the use efficiency of the resources of access networks 1 and 2 can be increased.

Thereupon, when MN 5 moves further and approaches router R23, it detects radio signal from router R23. If the reception level of the radio signal from router R23 is greater than the reception level of the radio signal from router R22, then the MN 5 switches its connection to router R23.

After switching the connection, the MN 5 receives a router advertisement message from router R23. The MN 5 updates CoA3 to CoA4, and registers its position in the HA. Furthermore, the radio signal from the router B15 ceases to reach the MN 5, and its connection with router B15 is severed.

Thereby, the MN 5 can no longer receive the router advertisement message from router B15, and after a prescribed time period has elapsed, it deletes CoA2 and halts the operation of the communication interface unit I1 used to connect to access network 1 (for example, by disconnecting the power supply thereof). Moreover, since CoA2 can no longer be updated in the HA, the registration of CoA2 in the HA is deleted after a prescribed time period. Ultimately, the HA forwards packets addressed to the MN 5, to CoA4 only.

In this way, in the present embodiment, it is possible to prevent packet loss or disconnection of applications, when the MN 5 performs handover from one access network to another access network, whilst also achieving efficient use of resources.

In the embodiment described thus far, the explanation was premised on the IPv6 protocol, but the present invention may also be applied to IPv4. In this case, an ICMP message is used for the router advertisement message (including the end message).

At least one of the routers B11 to B16 and B21 to B26 may be a router provided with an HA or FA (Foreign Agent) in mobile IP. Moreover, at least one of the routers B11 to B16 and B21 to B26 may be a radio network node (RNN) in hierarchical mobile IP. Furthermore, at least one of these routers may be an access router (AR) or mobility anchor point (MAP) in hierarchical mobile IPv6.

According to the present invention, it is possible to prevent packet loss or disconnection of applications during handover. Moreover, according to the present invention, it is possible to reduce the fees charged to the mobile communication terminal by the carrier, whilst also achieving efficient use of network resources.

What is claimed is:

1. A mobile communication terminal comprising:
    a first communication unit for performing radio communications with at least one of a plurality of routers provided in a first mobile communication network;
    a second communication unit for performing radio communications with at least one of a plurality of routers provided in a second mobile communication network; and
    a control unit for controlling said second communication unit so that said second communication unit initiates communications with said router provided in said second mobile communication network, whilst said first communication unit is communicating with a router located in an end section of a communication area of said first mobile communication network, upon receiving a message sent by said router located in said end section, said message indicating that said router is located in the end section.

2. The mobile communication terminal according to claim 1, wherein said control unit switches off power supplied to said second communication unit until said first communication unit receives said message, and switches on the power supplied to said second communication unit, when said first communication unit receives said message.

3. A mobile communication network system comprising a first mobile communication network having a plurality of routers, a second mobile communication network having a plurality of routers, and a mobile communication terminal;
    wherein, of the plurality of routers of said first mobile communication network, a router located in an end section of a communication area of said first mobile communication network comprises a transmission unit for sending an end message indicating that it is located in the end section of said communication area, to said mobile communication terminal, and
    said mobile communication terminal comprises:
    a first communication unit for performing radio communications with at least one of the plurality of routers of said first mobile communication network;
    a second communication unit for performing radio communications with at least one of the plurality of routers provided in said second mobile communication network; and
    a control unit for controlling said second communication unit so that said second communication unit initiates communications with said router provided in said second mobile communication network, whilst said first communication unit is communicating with the router located in the end section of the communications area of said first mobile communication network, upon receiving the end message sent by said router located in said end section.

4. A communication method in a mobile communication network system comprising a first mobile communication network having a plurality of routers, a second mobile communication network having a plurality of routers, and a mobile communication terminal, comprising steps of:
    in a router located in an end section of a communication area of said first mobile communication network, of the plurality of routers of said first mobile communication network, sending an end message indicating that said router is located in the end section of said communication area, to said mobile communication terminal; and
    in said mobile communication terminal, initiating communications with a router provided in said second mobile communication network, whilst said mobile communication terminal is communicating with the router located in the end section of the communication area of said mobile communication, upon receiving said end message sent by said router located in said end section.

* * * * *